(12) United States Patent
Lee et al.

(10) Patent No.: US 9,386,886 B2
(45) Date of Patent: Jul. 12, 2016

(54) OVER SINK KITCHEN WORK STATION

(71) Applicant: Robinson Home Products Inc., Williamsville, NY (US)

(72) Inventors: Stuart Harvey Lee, Forest Hills, NY (US); Inbal Zahava Aderka, Brooklyn, NY (US)

(73) Assignee: Robinson Home Products Inc., Williamsville, NY (US)

( * ) Notice: Subject to any disclaimer, the term of this patent is extended or adjusted under 35 U.S.C. 154(b) by 41 days.

(21) Appl. No.: 14/169,607

(22) Filed: Jan. 31, 2014

(65) Prior Publication Data
US 2015/0216365 A1    Aug. 6, 2015

(51) Int. Cl.
| | | |
|---|---|---|
| A47G 29/00 | (2006.01) | |
| A47G 29/08 | (2006.01) | |
| A47J 47/20 | (2006.01) | |
| A47J 43/24 | (2006.01) | |
| A47L 17/02 | (2006.01) | |
| A47L 19/04 | (2006.01) | |
| A47J 47/16 | (2006.01) | |
| A47J 47/00 | (2006.01) | |

(52) U.S. Cl.
CPC ........ *A47J 47/20* (2013.01); *A47J 43/24* (2013.01); *A47J 47/16* (2013.01); *A47L 17/02* (2013.01); *A47L 19/04* (2013.01); *A47J 47/005* (2013.01)

(58) Field of Classification Search
CPC ......... A47J 47/20; A47J 43/24; A47J 47/005; A47J 47/16; A47J 47/00; A47J 43/22; A47L 17/02; A47L 19/04; A47L 15/0089; A47L 17/00; A47L 19/02; A47L 19/00; A47L 15/50; A47F 7/0028; A47F 7/0064; A47F 7/0071; A47B 77/02; A47B 77/14; A47B 77/16; A47B 77/18; A47B 75/00; A47B 96/18
USPC ............... 211/41.2, 85.4, 85.25, 41.3, 126.1; D7/667, 668, 400; 220/6, 8, 485, 629, 220/487, 572; 210/249, 473, 497.01, 498, 210/470, 499; 99/495
See application file for complete search history.

(56) References Cited

U.S. PATENT DOCUMENTS

| | | | | |
|---|---|---|---|---|
| 1,389,908 | A * | 9/1921 | Shults et al. | 211/85.25 |
| 1,708,424 | A * | 4/1929 | McLeskey | 126/332 |
| 3,401,650 | A * | 9/1968 | Terezas | 108/25 |
| 4,033,461 | A * | 7/1977 | Nevai | 211/85.25 |
| 4,041,964 | A * | 8/1977 | Shamoon | 134/115 R |
| 5,312,178 | A * | 5/1994 | King | 312/140.4 |
| 5,331,904 | A * | 7/1994 | DiSimone | B25H 1/12 108/143 |
| 5,363,755 | A * | 11/1994 | Liang | 99/484 |
| D361,272 | S * | 8/1995 | Craft et al. | D7/698 |
| 5,992,676 | A * | 11/1999 | Tsai | 220/485 |
| 6,129,344 | A * | 10/2000 | Yang | 269/15 |
| 6,182,305 | B1 * | 2/2001 | O'Connell et al. | 4/631 |
| 6,371,470 | B1 * | 4/2002 | Ward | 269/289 R |
| 6,508,368 | B1 * | 1/2003 | Arce, Jr. | 211/41.3 |
| 6,547,080 | B1 * | 4/2003 | Guard | 210/464 |
| 6,938,784 | B2 * | 9/2005 | Yang | 211/87.01 |
| D514,764 | S * | 2/2006 | Kumagai | D32/55 |
| 7,025,216 | B2 * | 4/2006 | Kaczmarek | 211/133.6 |
| D526,541 | S | 8/2006 | Repp et al. | |
| D558,535 | S * | 1/2008 | Curtin | D7/667 |

(Continued)

*Primary Examiner* — Jennifer E Novosad
(74) *Attorney, Agent, or Firm* — Florek & Endres PLLC

(57) ABSTRACT

An over sink work station comprising a frame and two or more inserts, the frame having two or more openings with each opening adapted to removably receive an insert and at least a first insert comprising a container.

12 Claims, 10 Drawing Sheets

(56) References Cited

U.S. PATENT DOCUMENTS

| | | | |
|---|---|---|---|
| D581,747 S | 12/2008 | Repp et al. | |
| D588,536 S | 3/2009 | Wahl et al. | |
| D588,537 S | 3/2009 | Allen | |
| 7,654,402 B2 | 2/2010 | Kusuma et al. | |
| 7,678,271 B2 * | 3/2010 | Curtin | 210/232 |
| D652,695 S | 1/2012 | Lee et al. | |
| D656,800 S | 4/2012 | Lee et al. | |
| D660,661 S | 5/2012 | Lee et al. | |
| D661,955 S | 6/2012 | Lee et al. | |
| D671,802 S * | 12/2012 | Lee et al. | D7/667 |
| D688,019 S | 8/2013 | Lee et al. | |
| 8,763,818 B1 * | 7/2014 | Pargansky | 211/41.3 |
| 2002/0148831 A1 * | 10/2002 | Dicello et al. | 220/23.2 |
| 2004/0262247 A1 * | 12/2004 | Moon | A47F 7/28 211/74 |
| 2008/0104747 A1 * | 5/2008 | Mulaw | 4/658 |
| 2008/0149552 A1 * | 6/2008 | Murphy | A47J 43/24 210/251 |
| 2008/0296823 A1 * | 12/2008 | Pourounidis et al. | 269/289 R |
| 2012/0111815 A1 * | 5/2012 | Berry | 211/74 |
| 2013/0241127 A1 * | 9/2013 | Yang | 269/15 |
| 2015/0076974 A1 * | 3/2015 | Schreiter | 312/140.4 |

* cited by examiner

OVER SINK KITCHEN WORK STATION

FIELD OF THE INVENTION

The present invention relates to household or kitchen items and, more particularly, to an over sink work station which may be used in preparing food items over a sink.

BACKGROUND OF THE INVENTION

Sinks are an essential work area in a kitchen, where a variety of food preparation occurs. For example, colanders are well known kitchen objects used over a sink, to prepare food items by rinsing them, to strain food items such pasta after boiling, etc., allowing the passage of liquids through holes or pores in the colander while retaining the food items within the colander. Additionally, bowls are often used to soak food items in water during preparation, such as soaking fruits and vegetables prior to cooking or eating raw, where the water in which the food items soaked is then poured down the sink drain. Also, cutting boards are often used in the area of a sink to permit the cutting of food items into smaller pieces before or after soaking them or rinsing them.

Because food preparation items are often used over sinks due to the use of water in many aspects of food preparation, items such as over sink colanders have been developed. These types of colanders generally include a frame about the colander portion where either the size of the frame in one direction is wide enough to span a sink or the frame has one or more extendable arms that can be pulled from the frame to span the sink. These over sink colanders provide for drainage of the colander without placing the colander on the sink bottom or over a second pot or container.

Although a colander has been included with a frame that includes a cutting board, the cutting board is formed as part of the frame for the colander. In this device, the cutting board blocks access to the sink in the area of the cutting board, so that use of the colander with cutting board is dedicated to the cutting and rinsing of food items or as a colander exclusively.

However, when preparing two different food items that need to be maintained separately, i.e., when straining pasta and simultaneously cleaning salad, a cook has had to finish one task before using the colander to perform the second task. Alternatively, a cook would need a second colander where the first over sink colander would have to be moved off of the sink for a second colander to be placed in the sink. Of course, the prospect of using multiple colanders in the area of the sink, a focal point in a working kitchen that is often quite crowded with dishes, pots and utensils, is not always acceptable for a busy cook.

Moreover, if a cook wished to conduct different food preparation aspects at the same time, different devices would be needed. For example, a bowl next to the sink would serve to hold food items after rinsing in a colander or to soak food items prior to rinsing in a colander, or a cutting board would be used on a counter and then moved over a colander to deposit the pieces into the colander for rinsing, etc.

Therefore, a more efficient over sink kitchen device that could serve multiple functions simultaneously in the area of a kitchen sink would provide a more efficient food preparation experience and would advance the art.

SUMMARY OF THE INVENTION

The present invention is directed to an over sink work station comprising a frame and two or more inserts, the frame having two or more openings with each opening adapted to removably receive an insert. In the preferred embodiment, at least one of the inserts comprises a container and most preferably a colander. It is also preferred that the openings on the frame are the same size and shape so that each of the inserts can fit in any opening.

For the purposes of the present specification, the term insert will be used to describe any type kitchen item that is commonly used in the area of a sink. For example, a container, such as a colander, bowl, lidded bowl, etc., may be used as an insert, as may a cutting board or other food preparation item, without limitation.

Moreover, the use of a first insert comprising a colander and a second insert also comprising a second colander is a preferred embodiment. Notwithstanding, the present invention also contemplates a first insert comprising a colander and a second insert comprising a bowl, i.e., to soak a food item prior to rinsing in a colander, a lidded bowl for storing the prepared food items after being rinsed in the colander prior to serving, a cutting board for cutting food items before or after rinsing in a colander or any other insert suitable for use with the present invention.

It is also contemplated that the insert may be used separate from the frame if the user so desires. This permits the user to remove the container in the form of a bowl from the frame and to serve directly from the container, to remove the cutting board to serve prepared items to guests, or the like.

The inserts in the form of containers for use with the present invention can be any type of container, including standard wire mesh or plastic colanders, metal or plastic bowls, etc., but are preferably collapsible containers, as are well known in the art. In this regard, U.S. Pat. No. 7,678,271 generally describes collapsible containers including colanders and over sink colanders, designed to collapse so as to reduce the volume of the container when not in use.

The collapsible containers contemplated for use in the present invention typically have a rigid rim, a rigid base and an elastomeric middle portion, the rigid rim and base preferably being formed of an ABS material and the elastomeric middle portion preferably being formed of a silicon based thermoplastic material. To create the preferred collapsible functionality, the elastomeric middle portion preferably comprises two or more living hinges to permit the base of the container to fold into the middle of the container, thereby creating a more compact structure.

An insert in the form of a cutting board can be formed of any suitable material known in the art, and is preferably formed of a bacterial resistant or other material that is not affected by use in the area of water.

The insert also preferably includes one or more handles on the ends of the insert which aid the user in removing the insert from the frame and for otherwise handling the insert when separated from the frame. It is also contemplated that the insert can be removably fixed to the frame through the use of cooperating members on the insert and the frame. For example, a preferred insert may include a first cooperating member, in the form of a protrusion, detent or the like, placed on an outer, lower portion of the insert, which snaps over a second cooperating member, such as the edge of the opening of the frame, to frictionally snap the insert into the opening of the frame.

In its preferred embodiment, the frame is adapted to span a sink, either inherently due to the dimensional length of the frame or through the use of one or more extendable arms that can extend from the frame to span a sink or retract into the frame for storage. In the preferred embodiment using two openings, the openings are placed along the length of the frame to maximize the size of the inserts.

Additionally, the preferred frame further comprises one or more height extensions on the bottom of the frame, in the form of stands, feet, legs, a platform, etc. (which will all be referred to as "legs" herein), that raise the frame off of a surface such as a counter on which the frame may be placed when not over a sink. The height of the legs is preferably sufficient to hold the insert(s) received in the opening(s) of the frame above the counter, without contacting the counter, to prohibit the inserts from being pushed upwardly out of the frame when placed on a counter.

The frame may be formed of any suitable material, however, in its preferred that the frame be formed of the same ABS material used to form the rigid rim and base of the preferred collapsible containers or other inserts.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENT

The following description of the preferred embodiment is presented to describe the present invention without limiting the scope of the appended claims in any manner whatsoever.

Figure 10:
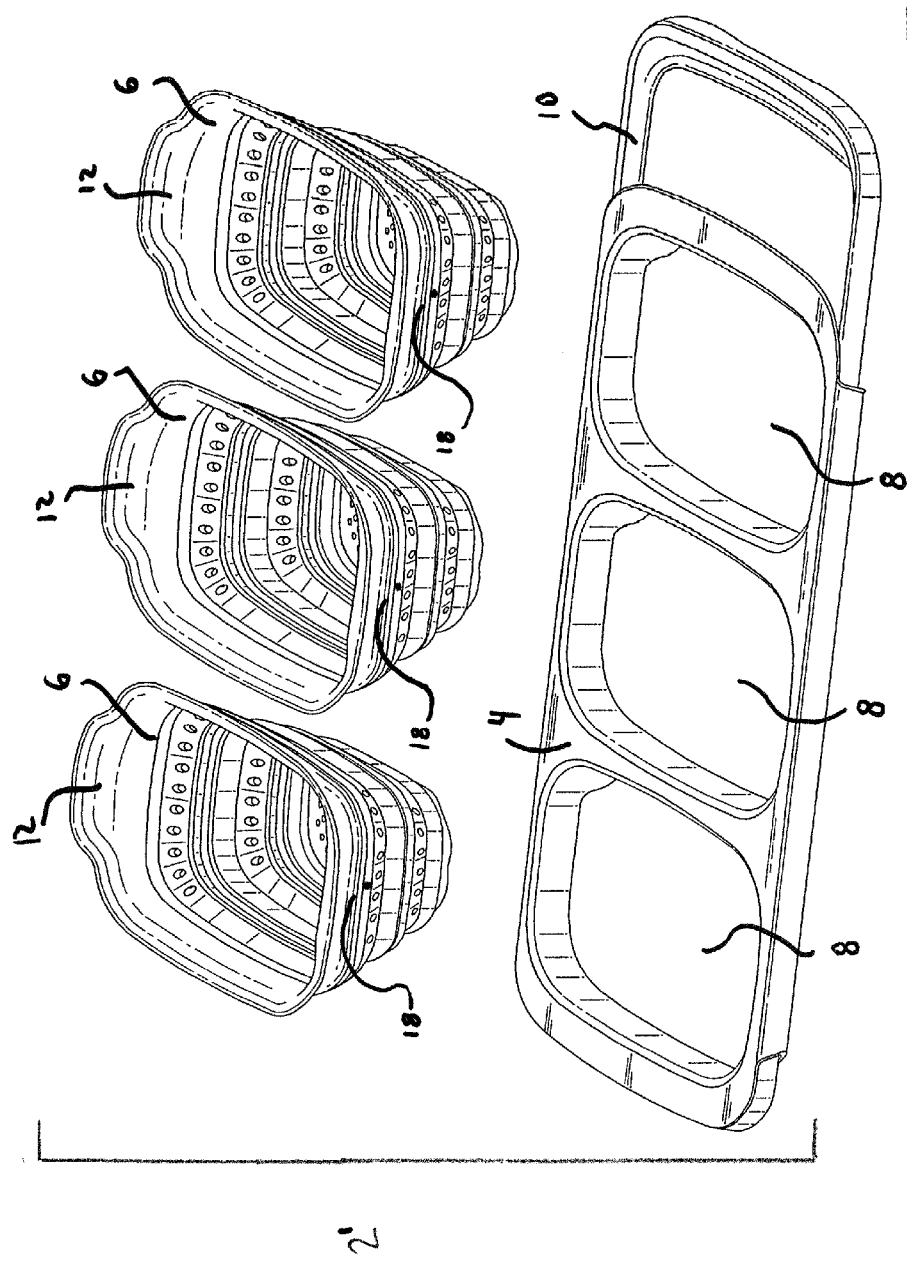
FIG. 10 is an exploded view of another embodiment of the over sink kitchen work station of the present invention showing more than two containers removed from the frame.

As shown in the Figures, the present invention is directed to an over sink work station 2 comprising a frame 4 and two or more removable inserts 6, the frame 4 having two or more openings 8 with each opening 8 adapted to removably receive an insert 6 and at least a first insert 6 comprising a container 6'. In the preferred embodiment shown in FIGS. 1-5, the work station 2 is fitted with inserts 6 comprising two containers which are both in the form of colanders 6' and the frame 4 comprises one or more extendable arms 10 to hold the work station 2 over a kitchen sink. In an embodiment shown in FIG. 10, the work station 2' comprises a frame 4 having three openings 8 with each opening 8 adapted to removably receive an insert 6.

Figure 5:
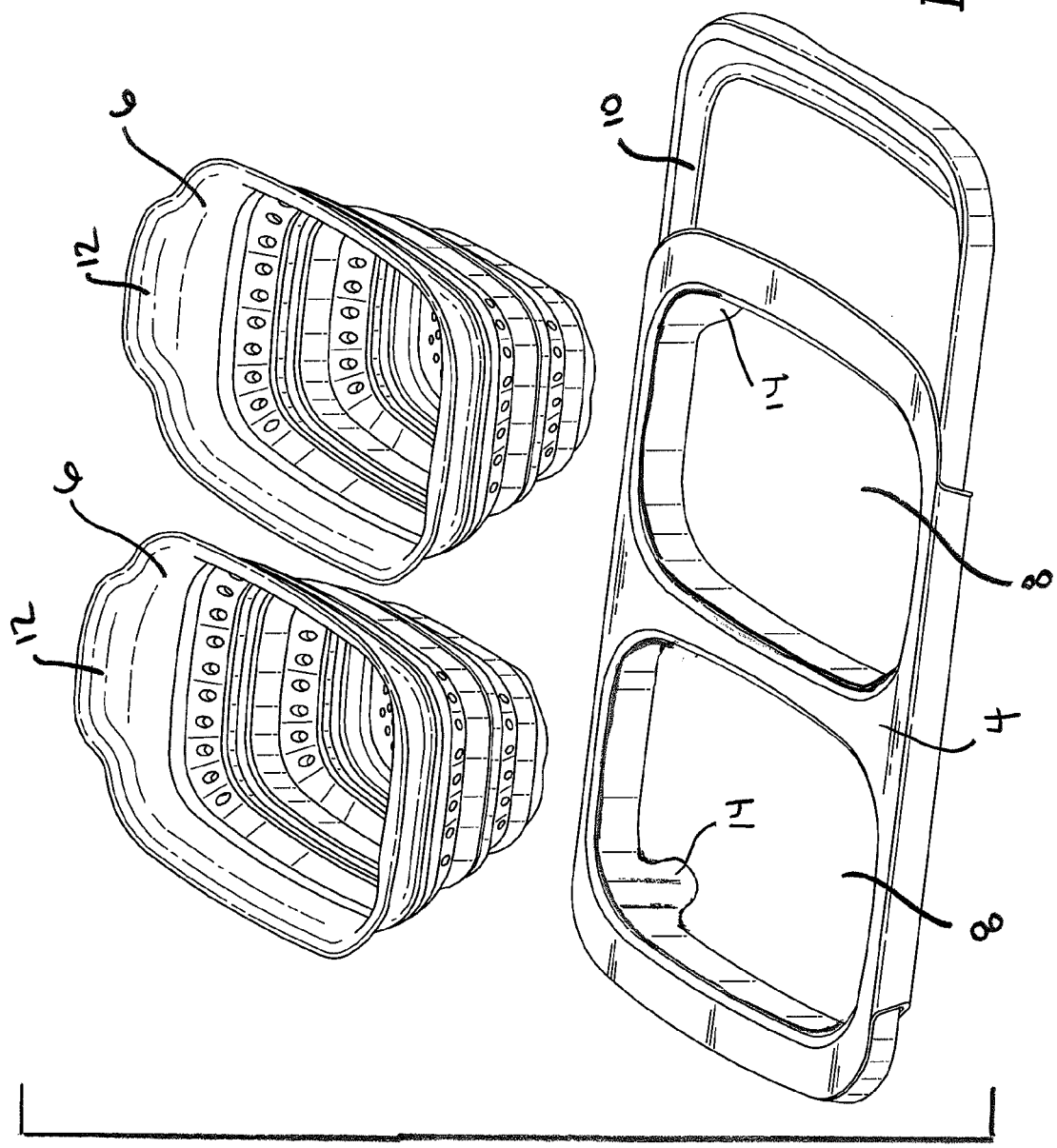
FIG. 5 is an exploded view of the over sink kitchen work station of the present invention showing the containers removed from the frame.

As shown in FIG. 5, the openings 8 in the preferred frame 4 are of the same size and shape, so that different inserts are interchangeable between openings. Moreover, although the frame 4 can be formed of a predetermined size with a length dimension sufficient to span a standard kitchen sink, the embodiment of the frame 4 shown here includes extendable arms 10 that can be distended to span a sink if the dimensional length is not itself sufficient to span the sink.

Figure 4:
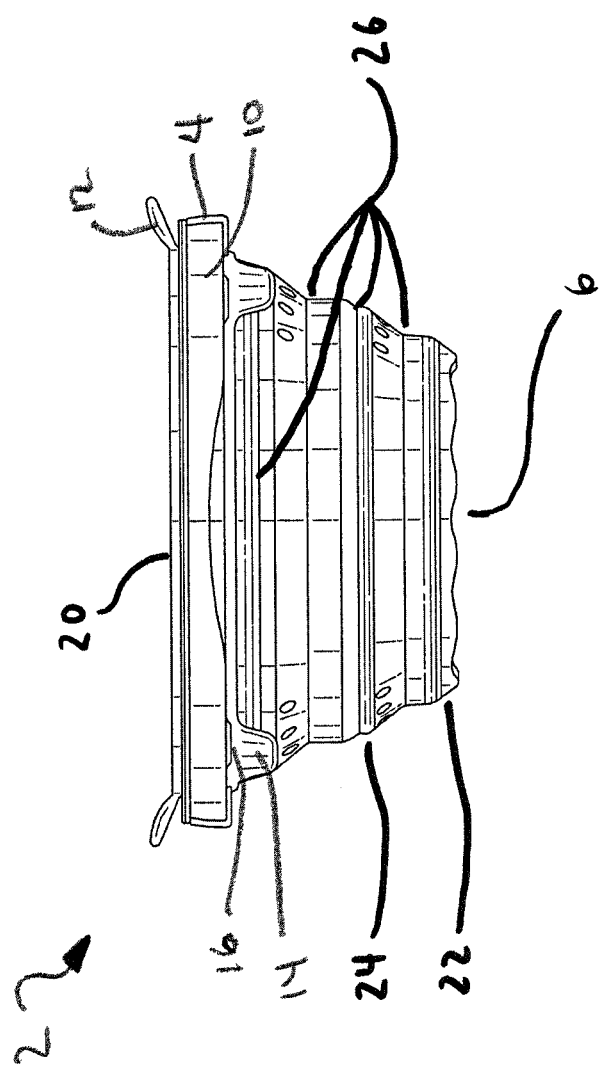
FIG. 4 is a side elevation of the over sink kitchen work station of the present invention of FIG. 1.

It is preferred that the inserts 6 engage the frame 4 through the use of one or more retention members 18 so that the insert(s) do not fall out when the frame 4 is inverted. Although any suitable retention member 18 or cooperating retention members 18 may be used for retaining the inserts 6 in the frame 4, it is preferred that frictional retention members 18 are incorporated on one or both of the inserts 6 and frame 4. For example, as illustrated in FIG. 4, the inserts 6 may include a retention member 18 in the form of a detent that protrudes from the lower, outer edge and snaps over the edge of the opening 8 to hold the insert 6 on the frame 4. Of course, any other such retention member 18 or cooperating retention members 18 can be used, including but not limited to clips, snaps, clamps, pins, latches, catches, etc., as a matter of design preference.

Figure 1:
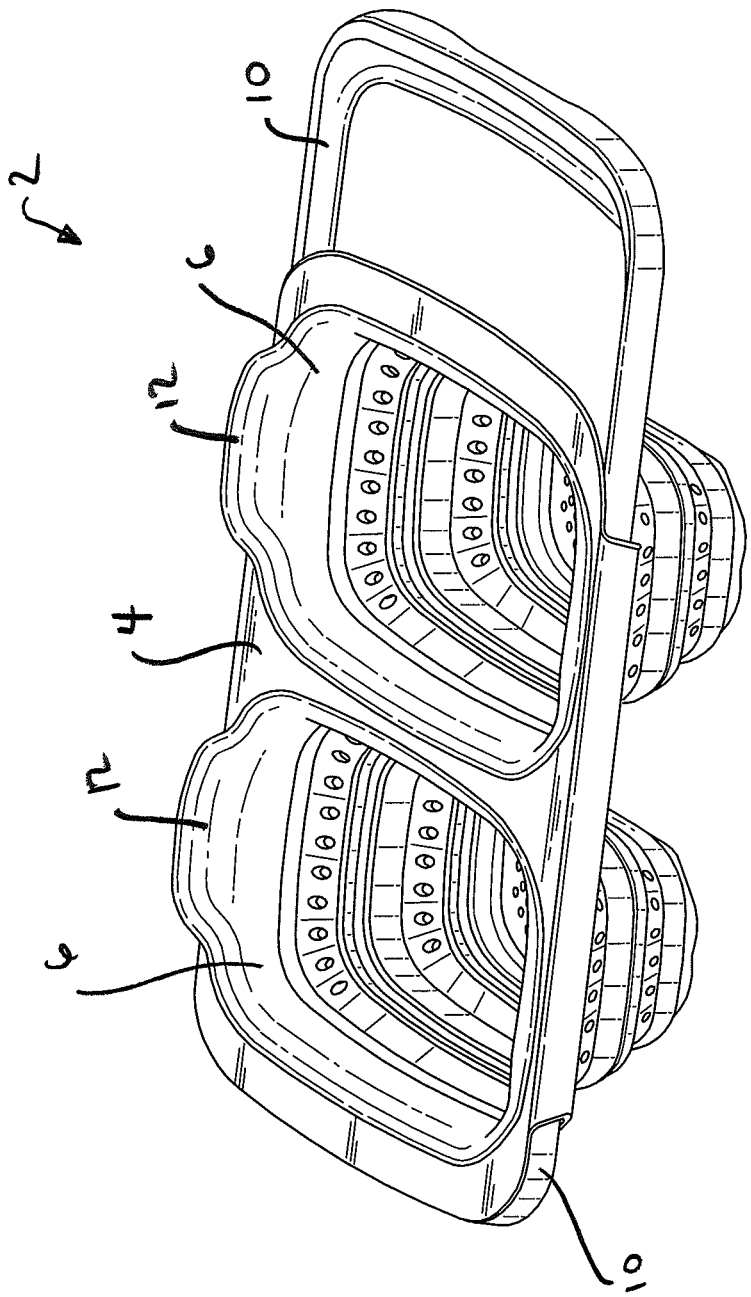
FIG. 1 is a perspective view of the over sink kitchen work station of the present invention with two inserts in the form of colanders fitted within a frame having one extendable arm extended.
Figure 2:
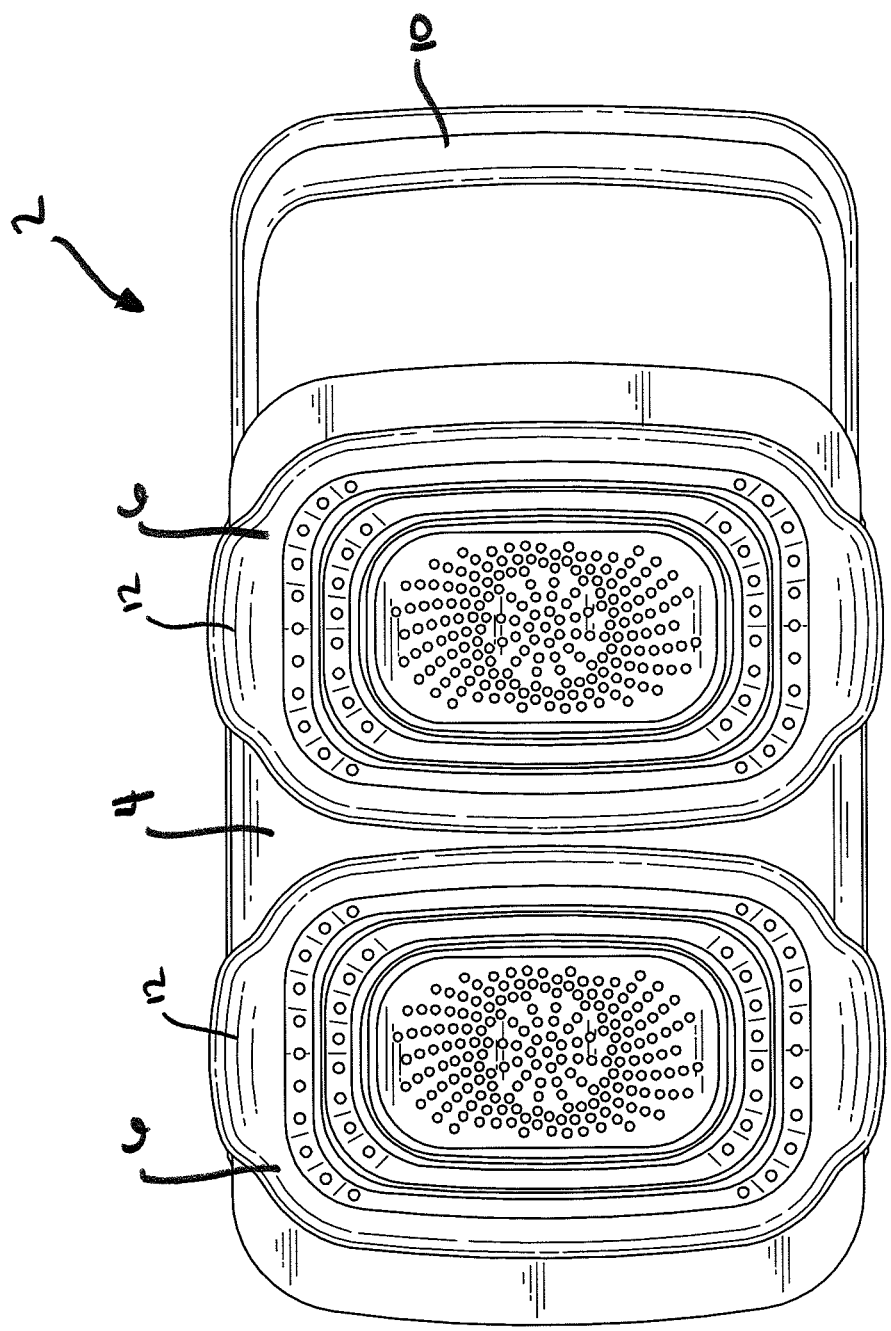
FIG. 2 is a top plan view of the over sink kitchen work station of FIG. 1.
Figure 3:
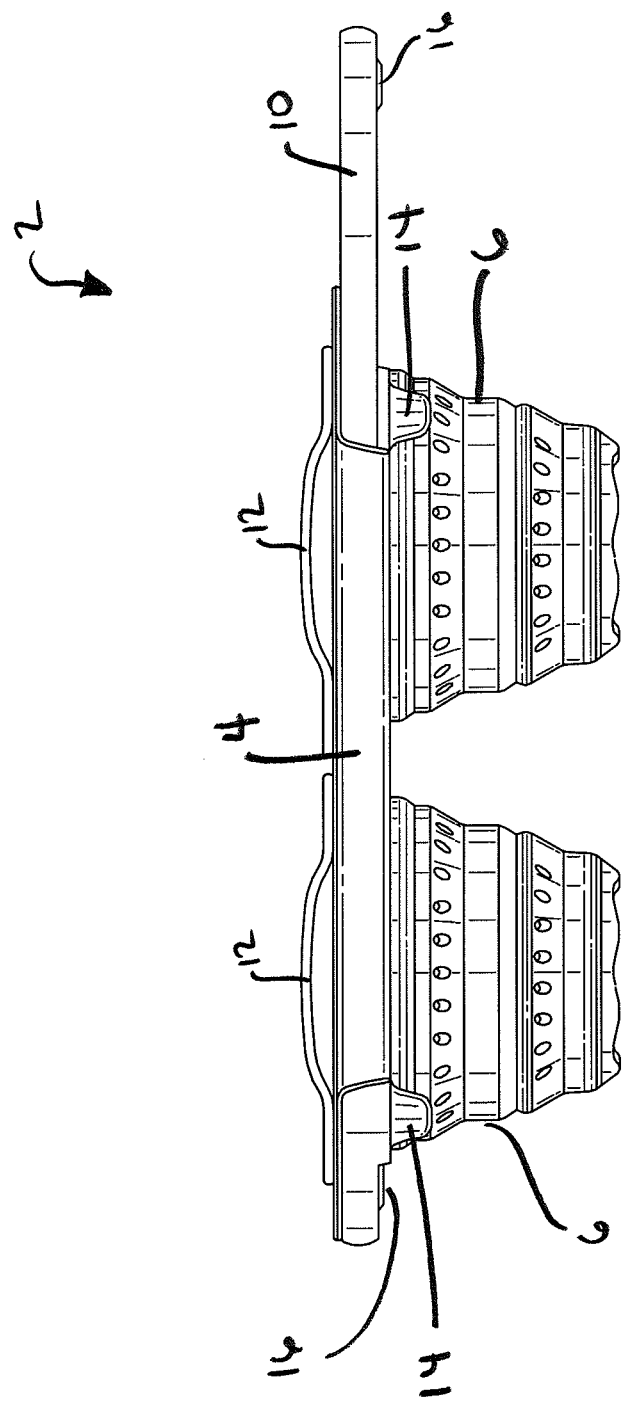
FIG. 3 is a front elevation of the over sink kitchen work station of FIG. 1.

The preferred inserts 6 further preferably comprise one or more handles 12, and most preferably two handles 12 on opposed sides of the insert 6 to lift the insert from the frame 4 or to otherwise aid in manipulating the insert 6. As best shown in FIG. 3, the preferred handles 12 are raised from the frame 4 to more easily permit the user to grasp the handles 12 for removing the insert 6 from the frame 4.

Figure 6:
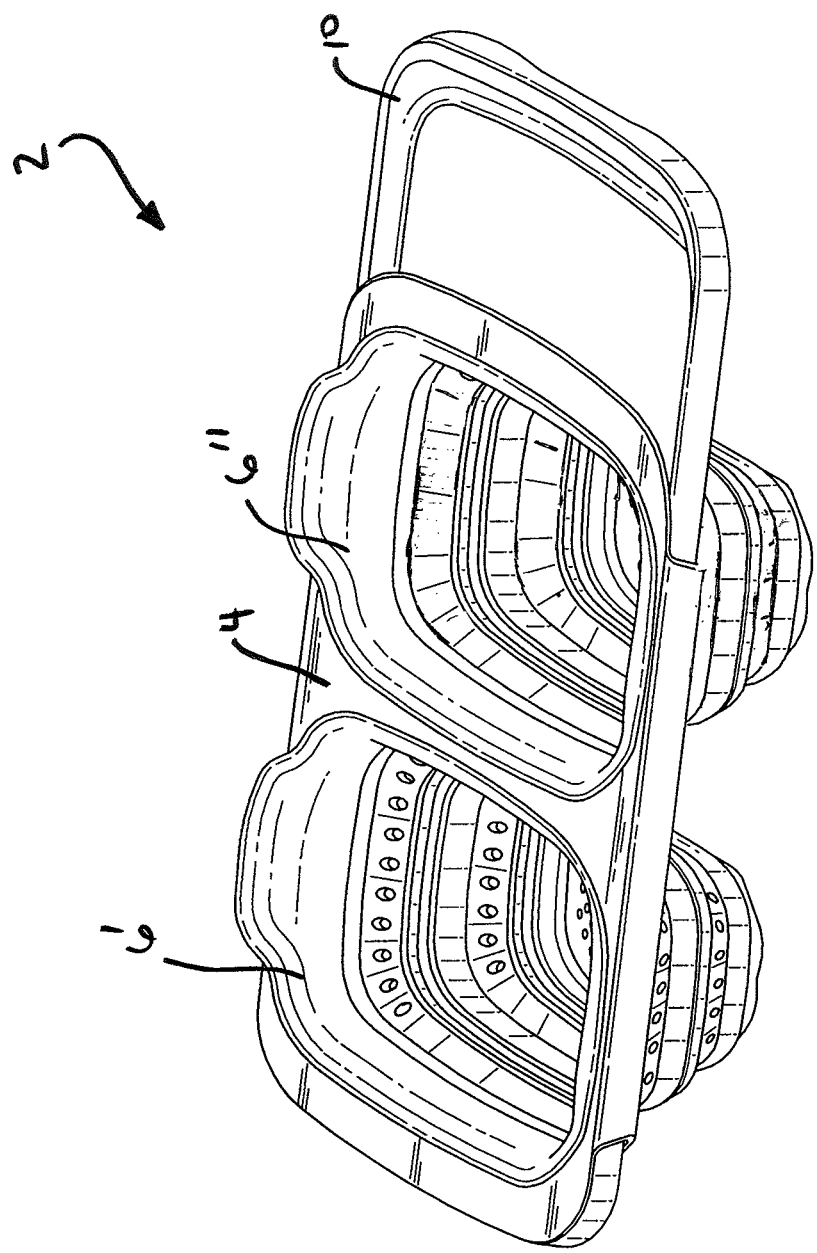
FIG. 6 is a perspective view of the over sink kitchen work station of the present invention with one container in the form of a colander and the other in the form of a bowl.
Figure 7:
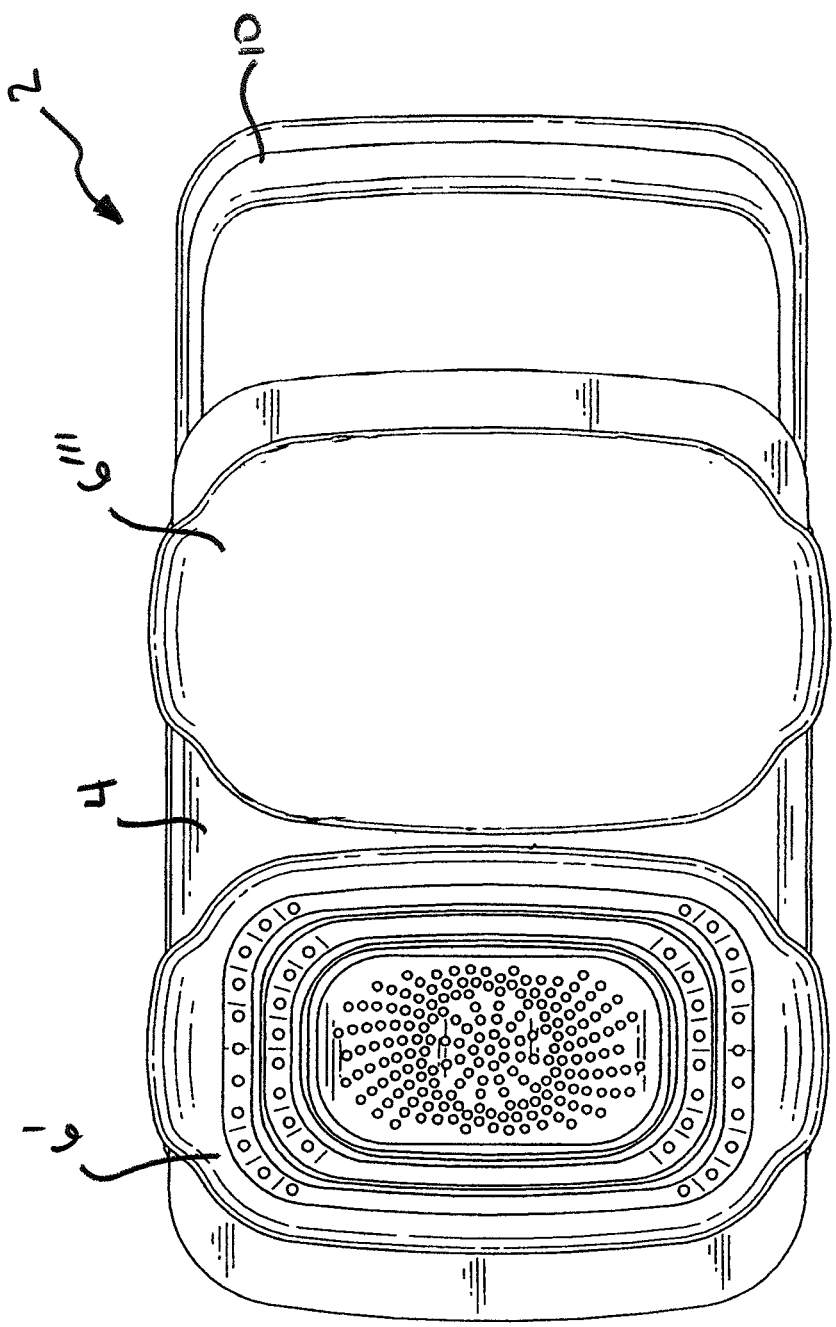
FIG. 7 is a top plan view of the over sink kitchen work station of the present invention with one container in the form of a colander and the other in the form of a cutting board.
Figure 8:
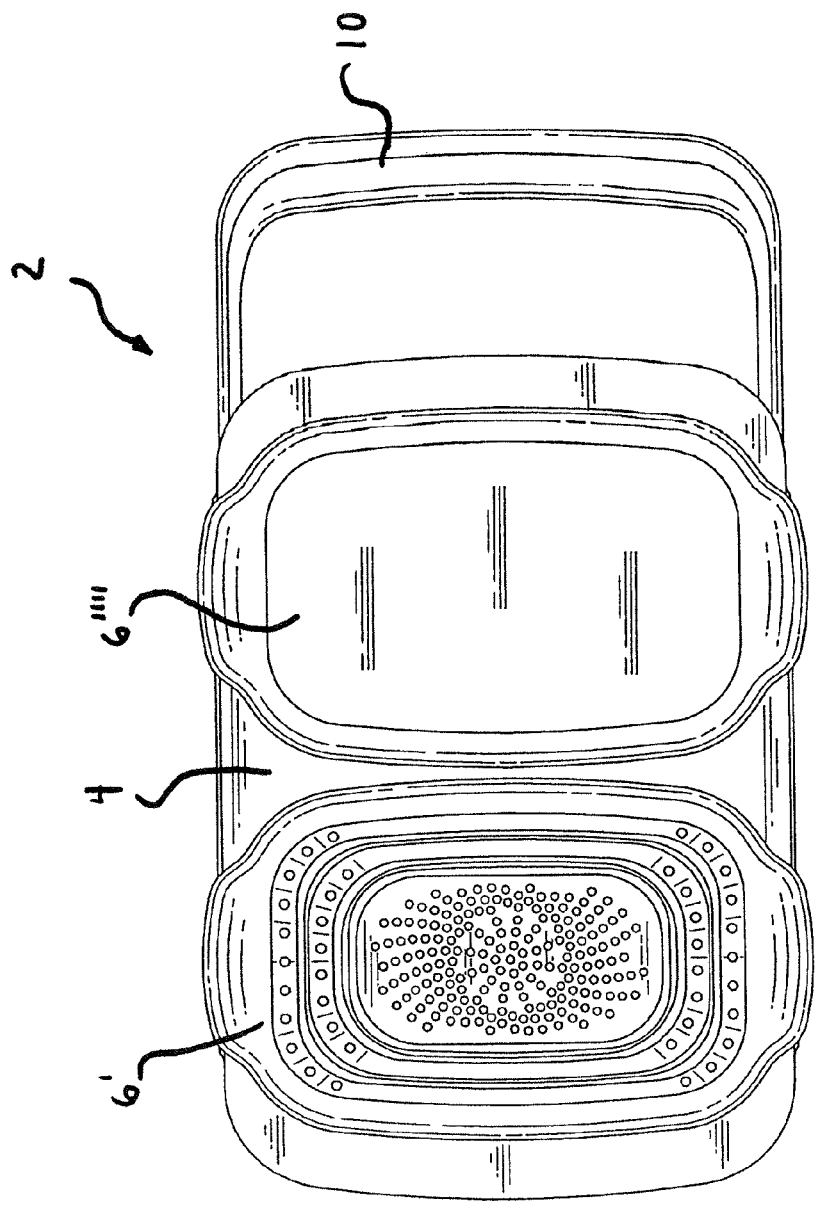
FIG. 8 is a top plan view of the over sink kitchen work station of the present invention with one container in the form of a colander and the other in the form of a lidded bowl.
Figure 9:
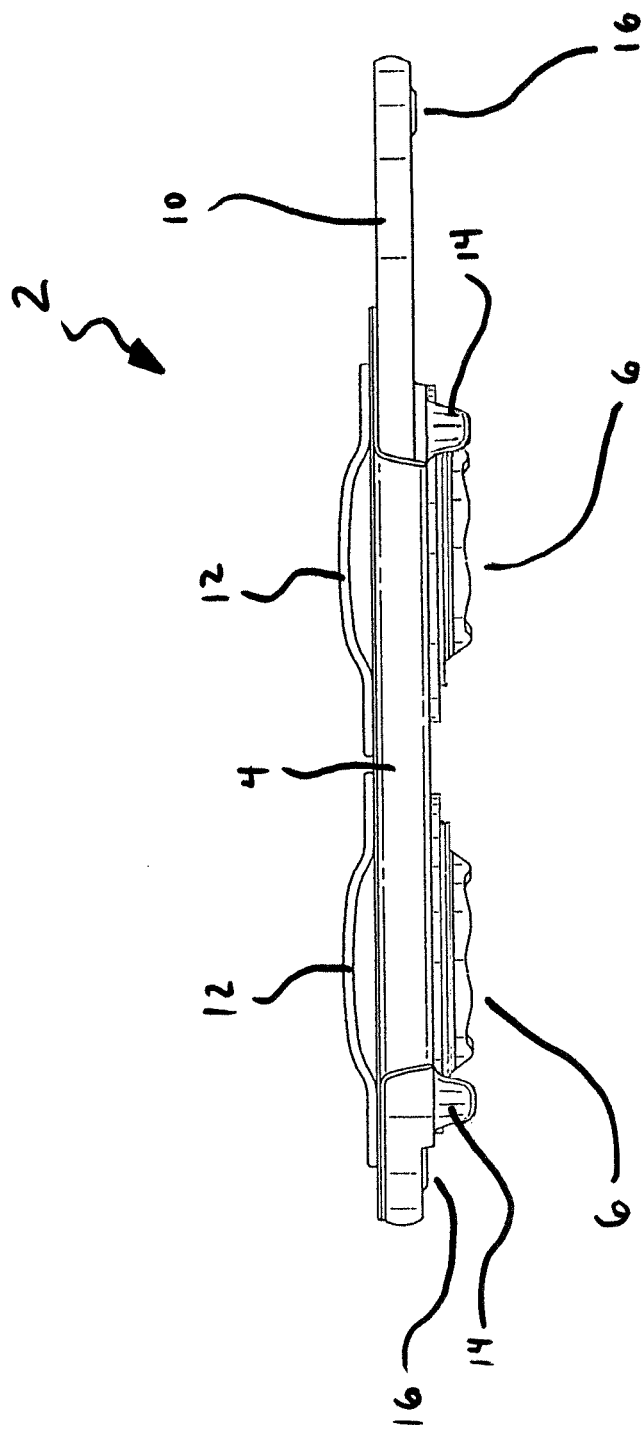
FIG. 9 is a side elevation of the over sink kitchen work station of the present invention of FIG. 1 with collapsible inserts in the collapsed configuration.

As stated above, the inserts 6 can take the form of any suitable kitchen item, preferably as used in the area of a sink. Notwithstanding, it is preferred that at least one of the inserts 6 comprise a container and most preferred that the container be in the form of a colander 6' which allows liquids to be drained from a food item or a bowl 6" (shown in FIG. 6) that can hold liquids for preparation of food items. The second insert 6 may also be a container, but can instead take the form of another kitchen item, such as a cutting board 6''' (shown in FIG. 7) or a lidded bowl 6'''' (shown in FIG. 8). When the insert 6 is a container, however, it is most preferred that the container be a collapsible container to reduce the space taken by the work station 2 when stored (shown in FIG. 9), as are well known in the art.

More particularly, as illustrated in FIG. 4, the preferred collapsible container intended for use in the work station 2 of the present invention includes a rigid rim 20, a rigid base 22 and an elastomeric middle portion 24, the rigid rim 20 and rigid base 22 preferably being formed of an ABS material and the elastomeric middle portion 24 preferably being formed of a silicon based thermoplastic material. To create the preferred collapsible functionality, the elastomeric middle portion 24 preferably comprises two or more living hinges 26 to permit the base of the container to fold into the middle of the container, thereby creating a more compact structure.

The preferred frame 4 includes a plurality of legs 14 that are intended to support the frame 4 when placed on a flat surface such as a counter when the work station 2 is not in use over a sink. As best shown in FIGS. 3 and 4, the legs 14 extend from the underside of the frame 4 to support the frame 4 when not used over a sink.

The height of the legs 14 can be any suitable height, however, it is most preferred that the legs 14 are of sufficient height to raise the bottom of the inserts 6 above a surface on which the work station 2 rests, at least when the inserts 6 are collapsible containers in their collapsed configuration. In this regard, the height of the legs 14 provides that the work station 2 may rest on a counter or other flat surface without the bottoms of the inserts touching the counter and potentially dislodging the inserts 6 from the frame 4.

The preferred frame 4 also includes pads 16 on the corners of the frame bottom to hold the frame 4 over the sink. The pads 16 can merely comprise bumps that create a contact point between the edges of the sink or counter next to the sink and the underside of the frame, to minimize contact between the work station 2 and the counter. However, in a most preferred embodiment the pads 16 comprise a non-slip material such as a silicon based thermoplastic material, to limit slipping of the work station 2 on the sink edge or counter during use.

In addition to the use of the same or different types of inserts 6 within the openings 8 of the frame 4, it is intended that one of the inserts 6 may be removed from the frame 4 during use, at the option of the user. Removal of an insert permits use of the sink faucet draining directly into the sink by the user, rather than water from the faucet running on, into or over an insert 6.

Variations, modifications and alterations to the above detailed description will be apparent to those skilled in the art. All such variations, modifications and/or alternatives are intended to fall within the scope of the present invention, limited only by the claims. All cited patents and publications are hereby incorporated by reference.

We claim:

1. An over sink work station comprising a frame having a top surface and a bottom surface, and two or more removable inserts,
    the frame comprising a plurality of legs extending from the bottom surface of the frame, and two or more openings from the top surface of the frame through the bottom surface of the frame, with each opening adapted to removably receive one of said two or more inserts,
    wherein a first removable insert received in the frame is a first collapsible colander having an open configuration and a collapsed configuration and a second removable insert received in the frame is selected from the group consisting of a second collapsible colander, a collapsible bowl, a collapsible bowl with a lid, and a cutting board,
    wherein the frame is not enclosed beneath the bottom surface of the frame,
    wherein the first collapsible colander in an open configuration extends below the plurality of legs, and
    wherein the first collapsible colander in a collapsed configuration does not extend below the plurality of legs.

2. The over sink work station of claim 1 wherein the first and second collapsible colander, the collapsible bowl, and the collapsible bowl with a lid each comprises a rigid rim, a rigid base and an elastomeric middle portion comprising two or more living hinges.

3. The over sink work station of claim 1 wherein the second removable insert comprises the second collapsible colander.

4. The over sink work station of claim 1 wherein the second removable insert comprises the collapsible bowl or the collapsible bowl with a lid.

5. The over sink work station of claim 1 wherein the second removable insert comprises the cutting board.

6. The over sink work station of claim 1 wherein the frame comprises two openings of the same dimensions, so that the inserts are interchangeable.

7. The over sink work station of claim 1 wherein at least one of the inserts comprises one or more handles.

8. The over sink work station of claim 7 wherein at least one of the inserts comprises two handles located on opposing sides of the insert, and wherein the handles are raised from the top of the frame so as not to contact the top of the frame when the insert is resting on the top surface of the frame.

9. The over sink work station of claim 1 further comprising one or more retention elements for retaining one or more of the inserts on the frame.

10. The over sink work station of claim 9 wherein the one or more retention elements comprises a detent.

11. The over sink work station of claim 1 wherein the frame is formed of a rigid plastic material.

12. An over sink work station comprising a frame having a top surface and a bottom surface, and two or more removable inserts,
    the frame comprising a plurality of legs extending from the bottom surface of the frame, and two or more openings from the top surface of the frame through the bottom surface of the frame, with each opening adapted to removably receive one of said two or more inserts,
    wherein a first removable insert received in the frame is a first collapsible colander having an open configuration and a collapsed configuration and a second removable insert received in the frame is selected from the group consisting of a second collapsible colander, a collapsible bowl, a collapsible bowl with a lid, and a cutting board,
    wherein the frame is not enclosed beneath the bottom surface of the frame,
    wherein the first collapsible colander in an open configuration extends below the plurality of legs,
    wherein the first collapsible colander in a collapsed configuration does not extend below the plurality of legs,
    and further wherein each of the openings are of the same size and shape so that any of the two or more openings can fit any of the two or more inserts.

* * * * *